Figure 1:
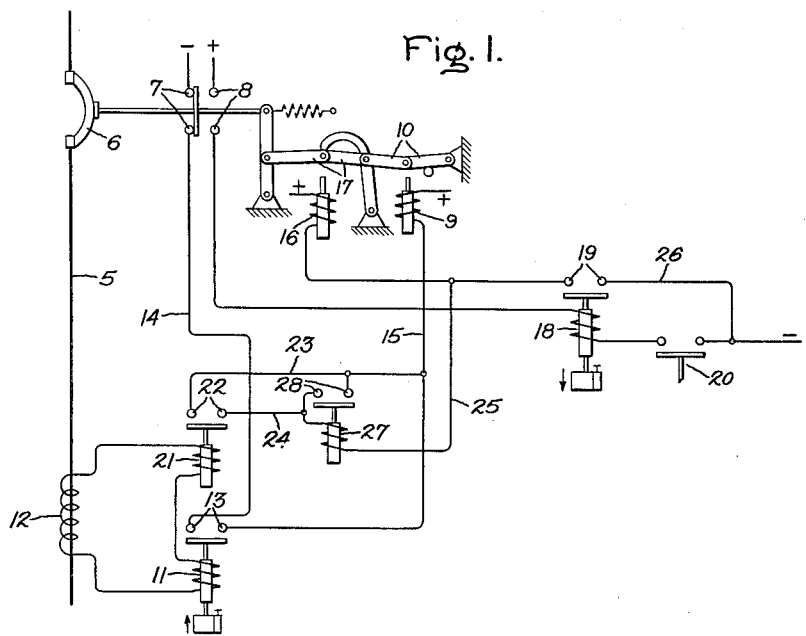

Feb. 10, 1942.   R. M. SPURCK   2,272,752
CONTROL OF ELECTRIC SWITCHES
Filed Sept. 19, 1940

Inventor:
Robert M. Spurck,
by Harry E. Dunham
His Attorney.

Patented Feb. 10, 1942

2,272,752

UNITED STATES PATENT OFFICE 2,272,752

CONTROL OF ELECTRIC SWITCHES

Robert M. Spurck, Llanerch, Pa., assignor to General Electric Company, a corporation of New York Application September 19, 1940, Serial No. 357,433

7 Claims. (Cl. 175—294)

My invention relates to improvements in the control of electric switches and more particularly to the opening of a circuit breaker on the occurrence of abnormal circuit conditions and the subsequent reclosing of the circuit breaker.

In the protection of electric power and distribution systems, it is frequently desirable to delay the opening of the line circuit breakers on the occurrence of abnormal circuit conditions. Thus, for example, on radial lines, selective action to disconnect the minimum amount of line on the occurrence of a fault may be on a time basis such that the nearer a circuit breaker is to the source, the greater the time delay interposed in its opening. These graduated time delay actions are usually obtained by time element relays which may respond to any quantity which is a criterion of the fault, for example excess current, under voltage, distance to fault, etc. Since it is important quickly to restore service, the circuit breakers are provided with a closing means which may be either manually or automatically controlled. But reclosing a circuit breaker on a faulty line results in a system shock which involves danger to apparatus if the circuit breaker is allowed to remain closed. This danger can be minimized if the circuit breaker is immediately opened when closed during the existence of a fault. Moreover, the electromagnetic forces acting on the breaker mechanism due to a large fault current may be so great that the operating mechanism cannot complete the closing action. In such cases, prolonged arcing may occur to damage the circuit breaker as well as to shock the system repeatedly.

One object of my invention is to provide an improved switch control arrangement for electric power and distribution systems such that, when on the occurrence of abnormal circuit conditions the opening of a circuit breaker is purposely delayed, the circuit breaker, if subsequently reclosed during the existence of the abnormal condition, is immediately reopened whereby to minimize damage to the circuit breaker and shock to the system. This and other objects of my invention will appear in more detail hereinafter.

In accordance with my invention, I effect an immediate opening of a circuit breaker which is reclosed on a faulty line by an arrangement which functions in dependence on the joint action of the circuit breaker closing means and a fault responsive means which is substantially instantaneous in its action.

My invention will be better understood from the following description when considered in connection with the accompanying sheet of drawings and its scope will be pointed out in the appended claims.

Figure 2:
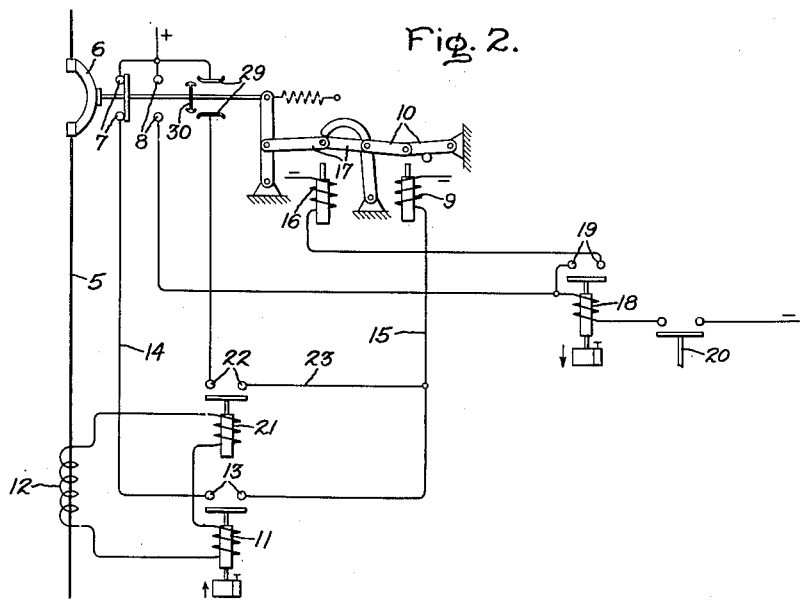

In the accompanying drawing, Fig. 1 illustrates in single line diagram, for simplicity, a circuit breaker control arrangement embodying my invention, and Fig. 2 similarly illustrates a modification of the embodiment of my invention shown in Fig. 1.

In the embodiment of my invention shown in Fig. 1, an electric power or distribution line 5 is arranged to be controlled by a circuit breaker 6 which is schematically illustrated as of the latched-closed trip-free type, examples of which are well known to the art. Also, as shown, the circuit breaker 6 is provided with "a" and "b" auxiliary switch contacts 7 and 8, respectively, for reasons subsequently to appear.

For effecting the opening of the circuit breaker 6 in response to abnormal line conditions, there is provided a trip coil 9 which, when energized, moves its armature to collapse the circuit breaker latching or holding toggle 10. For controlling the energization of the trip coil 9, any suitable fault responsive means, such as a time element overcurrent relay 11, may be used. This relay may be connected to the secondary of a current transformer 12 in the line 5 to be energized in accordance with the current therein. The relay 11 has circuit closing contacts 13 in series in the trip coil circuit which comprises the conductors 14 and 15.

For closing the circuit breaker 6, there may be provided suitable means, such as a closing coil 16, which, upon energization, causes its armature to move the closing toggle 17 into the over-center position shown and thereby to close the circuit breaker if the holding toggle 10 is in the position illustrated.

For effecting the energization of the closing coil 16, there may be provided any suitable switching means, such as a control relay 18, having circuit closing contacts 19. These may be closed substantially instantaneously but are time delayed in opening in order to allow for latching the circuit breaker operating mechanism. The energizing circuit of the control relay 18 may be controlled by any suitable switching means 20 which may be either manually or automatically controlled as is well known to the art. Deenergization of the control relay 18, when the circuit breaker 6 is closed, may be effected by including the auxiliary switch contacts 8 in the circuit of the winding of the relay.

In order to avoid damage to the circuit breaker 6 and shock to the system of which the line 5 is a part, I provide means dependent on the closing operation of the circuit breaker and responsive to abnormal line conditions for immediately effecting the opening of the circuit breaker upon closure thereof during the existence of an abnormal circuit condition. As shown in Fig. 1, this means comprises the control relay 18 and a substantially instantaneous fault responsive relay 21 jointly operative to control the tripping of the circuit breaker 6. Thus the circuit closing contacts 19 of the control relay 18 and the circuit closing contacts 22 of the fault responsive relay 21 may be arranged in series with each other and the trip coil 9 in a circuit comprising the conductors 15, 23, 24, 25 and 26. The fault responsive relay 21 is illustrated as an overcurrent relay, but it may be of any suitable type, examples of which are well known to the art. This relay 21, like the relay 11, is shown connected to the current transformer 12 for energization in accordance with the current in the line 5.

In order to insure energization of the trip coil 9 long enough to effect a positive tripping action, I may provide a seal-in type of auxiliary relay 27 whose winding is connected in the trip coil circuit controlled by the control relay 18 and the overcurrent relay 21. The circuit closing contacts 28 of the seal-in relay 27 are arranged to bypass the contacts 22 of the overcurrent relay and yet maintain the circuit of the trip coil 9 and the auxiliary relay 27 until the control relay contacts 19 are opened.

Assuming the parts positioned as shown in Fig. 1 and that an abnormal condition, such as a short-circuit, occurs on the line 5, then the excessive current will cause the operation of the fault responsive relay 11 to close its contacts 13 after a predetermined time to effect the energization of the trip coil 9 and thereby the opening of the circuit breaker 6. The closing of the switch 20 to effect the closing operation of the circuit breaker energizes the control relay 18 which closes its contacts 19 to complete the circuit of the closing coil 16. If the abnormal condition remains on the line 5, then, as soon as the contacts of the circuit breaker 6 make, the overcurrent relay 21 will be energized to close its contacts 22. Then, since the contacts 19 of the closing control relay 18 are still closed, the circuit of the trip coil 9 and the seal-in relay 27 is completed through the contacts 19 and the contacts 22. The trip coil is, accordingly, energized to trip the breaker, the circuit being maintained by the seal-in contacts 28 of the auxiliary relay 27 to insure a positive tripping action of the circuit breaker. Thus the circuit breaker is tripped out in case of abnormal line conditions immediately without waiting for the time delay of the fault responsive relay 11.

In the modification of my invention shown in Fig. 2 the immediate tripping action of the circuit breaker enclosed on a faulty line is effected by the instantaneous fault responsive relay 21 and means operative in dependence on the closing operation of the circuit breaker. As illustrated in Fig. 2, this means is an auxiliary switch of the passing contact type. As schematically shown, this switch comprises stationary contacts 29 which are arranged to be bridged by a contact member 30 as the breaker moves to the contacting closing position. These contacts are connected in series with the contacts 22 of the fault responsive relay 21 in the circuit of the trip coil 9. Thus, if the circuit breaker is closed on a fault, it will be immediately tripped. However, if it is not closed on a fault, the bridging contact member 30 will clear the stationary contacts 29 so that, in the ordinary normal operation of the circuit breaker, it will be tripped with the time delay by the fault responsive relay 11.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an electric circuit, means for interrupting said circuit, means responsive to an abnormal condition of said circuit for effecting a delayed circuit opening operation of said circuit interrupting means, means for closing said circuit interrupting means, and a plurality of means respectively operative in dependence on the operation of said closing means and on the existence of an abnormal circuit condition during such operation for effecting an immediate opening of said circuit interrupting means only upon operation of said closing means during the existence of the abnormal circuit condition.

2. In combination, an electric circuit, means for interrupting said circuit, means responsive to an abnormal condition of said circuit for effecting a delayed circuit opening operation of said circuit interrupting means, means for closing said circuit interrupting means, and means for effecting an immediate opening of said circuit interrupting means on closure thereof during the existence of an abnormal circuit condition comprising switching means controlled by the operation of said closing means and switching means responsive to an abnormal circuit condition.

3. In combination, an electric circuit, means for interrupting said circuit, means responsive to an abnormal condition of said circuit for effecting a delayed circuit opening operation of said circuit interrupting means comprising a time delay fault responsive relay and a trip coil, means for closing said circuit interrupting means comprising a closing control relay, and means for effecting an immediate energization of said trip coil on closure of said circuit interrupting means during the existence of an abnormal circuit condition comprising said closing control relay and a substantially instantaneous fault responsive relay connected to be energized from the circuit.

4. In combination, an electric circuit, means for interrupting said circuit, means responsive to an abnormal condition of said circuit for effecting a delayed circuit opening operation of said circuit interrupting means, means for closing said circuit interrupting means, means for effecting an immediate opening of said circuit interrupting means on closure thereof during the existence of an abnormal circuit condition comprising switching means operative to a predetermined circuit controlling position during the closing movement of the circuit breaker, and switching means responsive to an abnormal circuit condition.

5. In combination, an electric circuit, means for interrupting said circuit, means responsive to an abnormal condition of said circuit for effecting a delayed circuit opening operation of said circuit interrupting means comprising a time delay fault responsive relay and a trip coil, means for closing said circuit interrupting means, an auxiliary switch operative to the closed position during the closing movement of the circuit interrupting means, and means for effecting an immediate energization of said trip coil on closure of said circuit interrupting means during the existence of an abnormal circuit condition including a substantially instantaneous fault responsive relay connected to be energized from said circuit and having circuit closing contacts in the circuit of said trip coil and in series relation with the contacts of said auxiliary switch.

6. In combination, an electric circuit, means for interrupting said circuit, means responsive to an abnormal condition of said circuit for effecting a delayed circuit opening operation of said circuit interrupting means comprising a time delay fault responsive relay and a trip coil, means for closing said circuit interrupting means comprising a closing control relay having contacts in the circuit of said trip coil, and means for effecting an immediate energization of said trip coil on closure of said circuit interrupting means during the existence of an abnormal circuit condition including a substantially instantaneous fault responsive relay connected to be energized from said circuit and having circuit closing contacts in the circuit of said trip coil and in series relation with the contacts of said control relay.

7. In combination, an electric circuit, means for interrupting said circuit, means responsive to an abnormal condition of said circuit for effecting a delayed circuit opening operation of said circuit interrupting means, means for closing said circuit interrupting means, and means for effecting an immediate opening of said circuit interrupting means only in response to the existence of an abnormal condition on said circuit during the closing operation of said circuit interrupting means.

ROBERT M. SPURCK.